(12) United States Patent
Kropaczek et al.

(10) Patent No.: US 7,693,249 B2
(45) Date of Patent: Apr. 6, 2010

(54) METHOD OF IMPROVING NUCLEAR REACTOR PERFORMANCE

(75) Inventors: David Joseph Kropaczek, Kure Beach, NC (US); William Earl Russell, II, Wilmington, NC (US)

(73) Assignee: Global Nuclear Fuel - Americas, LLC, Wilmington, NC (US)

( * ) Notice: Subject to any disclaimer, the term of this patent is extended or adjusted under 35 U.S.C. 154(b) by 0 days.

(21) Appl. No.: 10/355,013

(22) Filed: Jan. 31, 2003

(65) Prior Publication Data

US 2004/0151274 A1 Aug. 5, 2004

(51) Int. Cl.
*G21C 7/36* (2006.01)
(52) U.S. Cl. .................. 376/215; 376/216; 376/245
(58) Field of Classification Search .............. 376/245, 376/260, 216, 215
See application file for complete search history.

(56) References Cited

U.S. PATENT DOCUMENTS

| | | | | |
|---|---|---|---|---|
| 4,039,375 A * | 8/1977 | Worlton et al. | ............... | 376/251 |
| 4,495,142 A * | 1/1985 | Nakayama et al. | .......... | 376/251 |
| 4,581,196 A * | 4/1986 | Sakagami et al. | ........... | 376/216 |
| 5,009,833 A * | 4/1991 | Takeuchi et al. | ............ | 376/217 |
| 5,333,157 A * | 7/1994 | Gross | ......................... | 376/251 |
| 5,392,320 A | 2/1995 | Chao | | |
| 5,519,740 A | 5/1996 | Chao | | |
| 5,537,450 A * | 7/1996 | Asay et al. | .................. | 376/253 |
| 5,706,321 A * | 1/1998 | Chen et al. | .................. | 376/463 |
| 5,790,616 A | 8/1998 | Jackson | | |
| 5,790,618 A | 8/1998 | Fawks, Jr. | | |
| 5,912,933 A * | 6/1999 | Shaug et al. | ................ | 376/216 |
| 6,216,109 B1 * | 4/2001 | Zweben et al. | ................ | 705/8 |
| 6,345,081 B1 * | 2/2002 | Sihver et al. | ................ | 376/245 |
| 6,404,437 B1 * | 6/2002 | Russell et al. | ............... | 345/473 |
| 6,748,348 B1 * | 6/2004 | Russell, II | ..................... | 703/6 |
| 2004/0059549 A1 * | 3/2004 | Kropaczek et al. | ............. | 703/2 |
| 2004/0059696 A1 * | 3/2004 | Kropaczek et al. | ............. | 706/46 |

FOREIGN PATENT DOCUMENTS

| | | |
|---|---|---|
| EP | 0 823 712 | 11/2001 |
| JP | 06-082592 | 3/1994 |
| JP | 10-123284 | 5/1998 |

OTHER PUBLICATIONS

Merriam Webster's Collegiate Dictionary, 10th Edition, 1993, p. 28.*
U.S. NRC Information Notice 93-82: "Recent Fuel and Core Performance Problems in Operating Reactors," Oct. 12, 1993.*
NRC Information Notice 93-82: Recent Fuel and Core Performance Problems in Operating Reactors, Oct. 12, 1993.*
Kothare et al., "Level Control in the Steam Generator of a Nuclear Power Plant", IEEE Transactions on Control Systems Technology, vol. 8, No. 1, Jan. 2000.*

(Continued)

*Primary Examiner*—Rick Palabrica
(74) *Attorney, Agent, or Firm*—Harness, Dickey & Pierce, P.L.C.

(57) ABSTRACT

The method of improving nuclear reactor performance involves generating an operational solution for a nuclear reactor based on a constraint accounting for a problem with operation of the nuclear reactor. The generated operational solution can then be implemented at the nuclear reactor.

24 Claims, 7 Drawing Sheets

OTHER PUBLICATIONS

Gudnov et al., "Behavior of Solid Fission Products in Coated Fuel Particles of a high-temperature Gas-Cooled Reactor" (Atomnaya Energiya, vol. 67, No. 2, pp. 93-97, Aug. 1989).*

Shinji Tokumasu, et al., "*A Mathematical Method for Boiling Water Reactor Control Rod Programming*," Nuclear Technology, vol. 71, Dec. 1985.

Toshio Kawai, et al., "*A Method for Generating a Control Rod Program for Boiling Water Reactors*," Nuclear Technology, vol. 28, Jan. 1976.

* cited by examiner

FIG. 7 ePrometheus - Hatch 1 - Cycle 1 - Test 5b - CS10:2671 <Online Operation>

WorkSpace  Input  Run  View  Reports  Window  Help

Input Deck

| Plant Configuration | Optimization Configuration | Optimization Constraints | Operations Configuration | Fuel Shuffling | Eigenvalue & Operating Limit | Select Files |

Optimization Configuration

58

| Constraint Description | Importance | Exposure Dependence | Design Value | Objective Add Funct. | Optimization Credits |
|---|---|---|---|---|---|
| Maximum MFLCPR — 50 | Nominal — 56 | ☐ Edit | 0.964 | ☐ | None |
| Maximum MFLPD | Nominal | ☐ Edit | 0.957 — 52 | ☐ — 54 | None |
| Maximum MAPLHGR | Nominal | ☐ Edit | 0.957 | ☐ | None |
| Minimum % Flow | Nominal | ☐ Edit | 85.0 | ☐ | None |
| Maximum % Flow | None | ☐ Edit | 100.0 | ☐ | None |
| Eigenvalue Upper Tolerance (ΔCycle) | None | ☐ Edit | 1.0E-4 | ☐ | None |
| Eigenvalue Lower Tolerance (ΔCycle) | | ☐ Edit | 1.0E-4 | | |

· · ·

METHOD OF IMPROVING NUCLEAR REACTOR PERFORMANCE

BACKGROUND OF THE INVENTION

Figure 1:
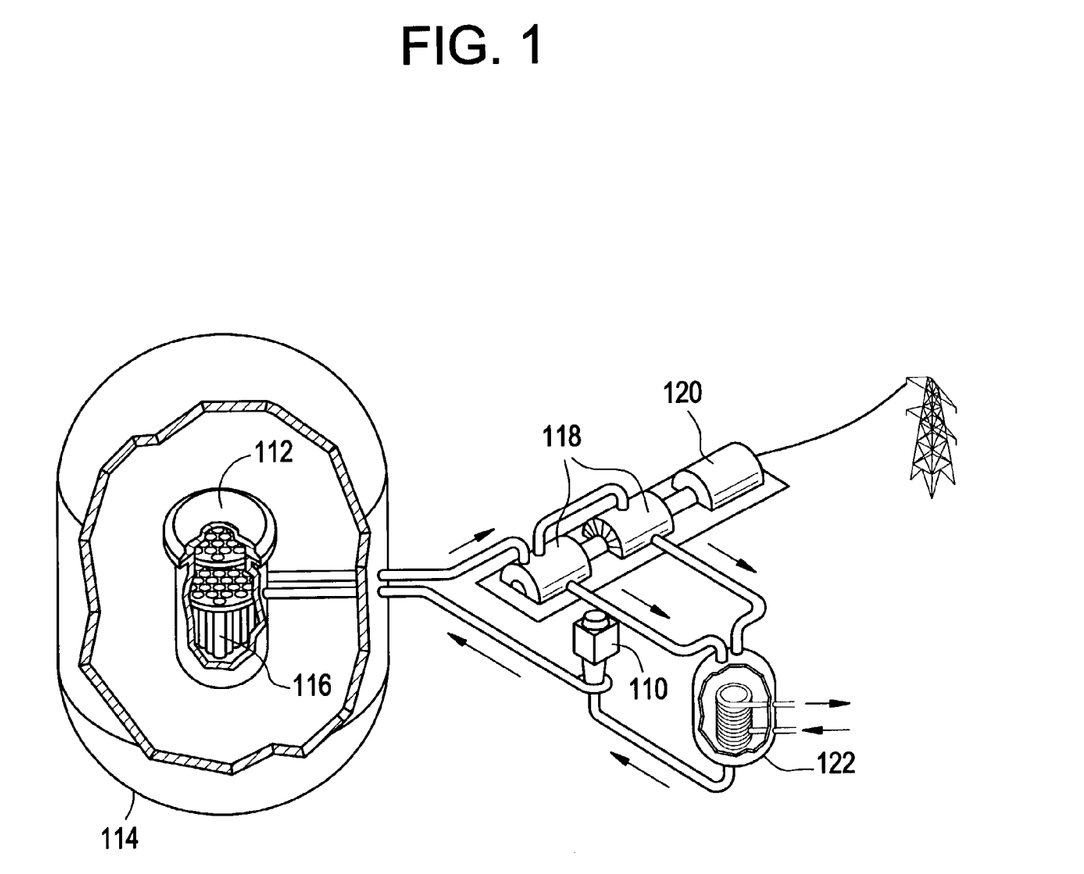
FIG. 1 illustrates a prior art boiling water reactor.

FIG. 1 illustrates a conventional boiler water reactor. As shown, a jet pump 110 supplies water to a reactor vessel 112 housed within a containment vessel 114. The core 116 of the reactor vessel 112 includes a number of fuel bundles such as described in detail below with respect to FIG. 2. The controlled nuclear fission taking place at the fuel bundles in the core 116 generates heat which turns the supplied water to steam. This steam is supplied from the reactor vessel to turbines 118, which power a generator 120. The generator 120 then outputs electrical energy. The steam supplied to the turbines 118 is recycled by condensing the steam back into water at a condenser 122, and supplying the condensed steam back to the jet pump 110.

Figure 2:
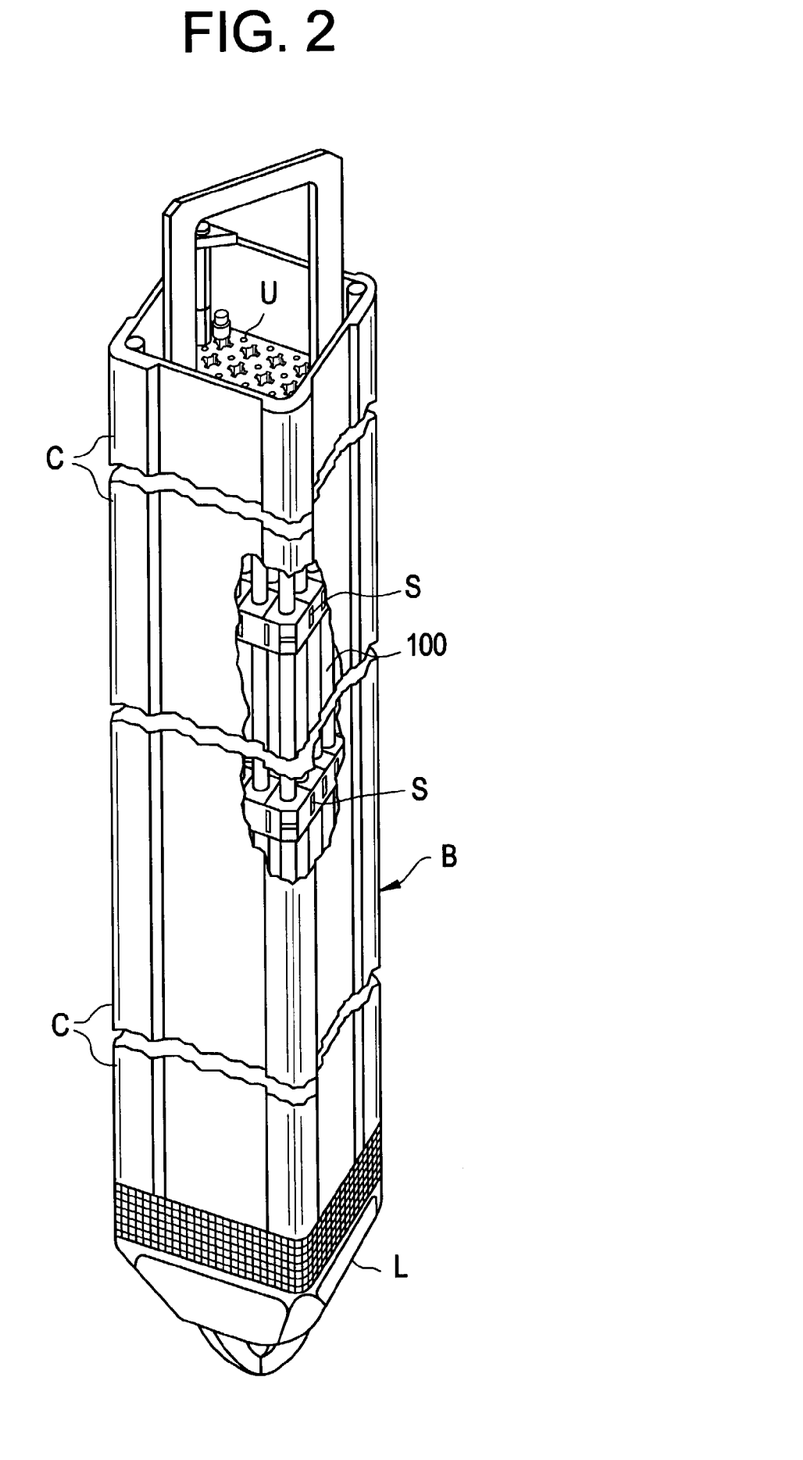
FIG. 2 is a perspective view of a prior art nuclear fuel bundle.
Figure 3:
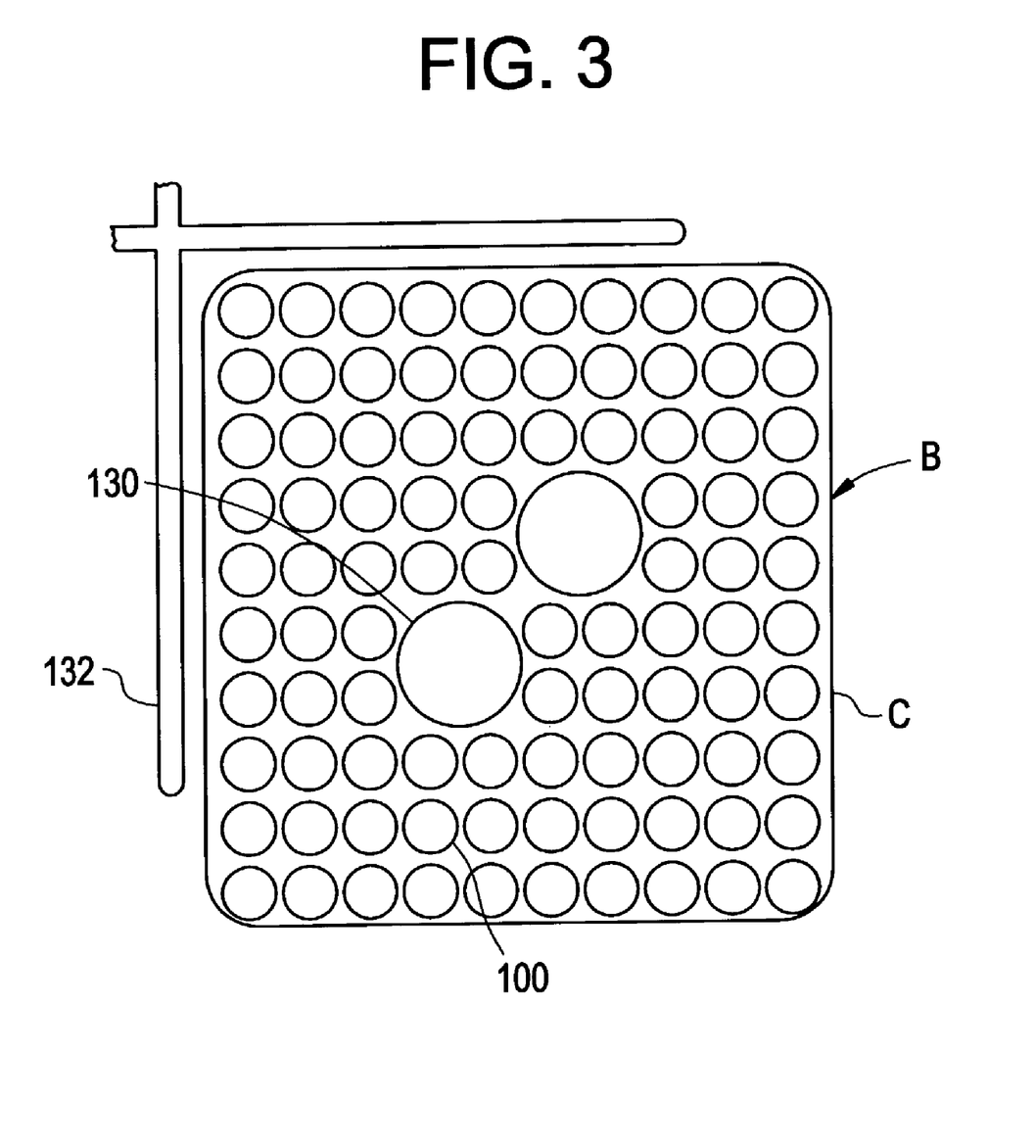
FIG. 3 is a schematic representation of a cross-section or lattice of the nuclear fuel bundle illustrated in FIG. 2.

FIG. 2 illustrates a fuel bundle in the core 116 of the reactor vessel 112. A typical core will contain anywhere from 200 to 900 of these bundles B. As shown in FIG. 2, the bundle B includes an outer channel C surrounding a plurality of fuel rods 100 extending generally parallel to one another between upper and lower tie plates U and L, respectively, and in a generally rectilinear matrix of fuel rods as illustrated in FIG. 3. The rods 100 are maintained laterally spaced from one another by a plurality of spacers S vertically spaced from the other along the length of the fuel rods within the channel C. Referring to FIG. 3, there is illustrated in an array of fuel rods 100, i.e., in this instance, a 10×10 array, surrounded by the fuel channel C. The fuel rods 100 are arranged in orthogonally related rows and also surround one or more water rods, two water rods 130 being illustrated. The fuel bundle B is arranged in one quadrant of a control rod 132 as is conventional. It will be appreciated that a fuel bundle is typically arranged in each of the other quadrants of the control rod 132. Movement of the control rod 132 up between the bundles B controls the amount of reactivity occurring in the bundles B in association with that control rod 132.

A boiling water reactor such as illustrated in FIG. 1 operates for a cycle of typically one, one and a half or two years. Specifically, a core of the reactor is designed to generate a certain amount of energy measured in gigawatt days per metric ton of uranium (GWD/MTU) over a cycle before being replaced with a new core. Core design typically involves a constraint optimization problem wherein a best possible solution that maximizes energy output is developed according to various well-known algorithms.

Namely, the solution to such a problem typically involves a mathematical search algorithm, whereby successively improved solutions are obtained over the course of a number of algorithm iterations. Each iteration, which can be thought of as a proposed solution, results in improvement of an objective function. An objective function is a mathematical expression having parameter values of a proposed solution as inputs. Typically, the objective function includes one or more mathematical expressions representing constraints of the problem at issue and the parameter or parameters being maximized/minimized. The objective function produces a figure of merit for the proposed solution. Comparison of objective function values provides a measure as to the relative strength of one solution versus another. Numerous search algorithms exist and differ in, for example, (1) the manner by which the control variables for a particular problem are modified, (2) whether a population of solutions or a single solution is tracked during the improvement process, and (3) the method for assessment of convergence. However, these search algorithms rely on the results of an objective function in deciding a path of convergence.

At the beginning of cycle (BOC), the core design is put into operation. As is also typical, actual reactor performance often deviates from the performance modeled in generating the core design. Accordingly, adjustments from the operational model are quite often made in order to maintain performance of the reactor before the end of cycle (EOC).

Some of the issues that arise during plant operation, which require such adjustments, can be classified according to the following:

1) mechanical degradation of the fuel or system components, that may require specific changes in reactor operation as well as imposition of additional constraints; and 2) deviations in predicted versus anticipated measured plant parameters of sufficient magnitude to require additional conservatism in reactor operation.

Among category 1), the following are exemplary events that have occurred in recent years:

1a) Leaking Fuel Rod

In this scenario, off-gas is detected indicating a ruptured fuel rod. Control blades are inserted in the area surrounding the suspect fuel rod in the hopes of reducing the off-gas, because in this case, off-gas release is a function of local power within the fuel rod. Normal operational practice is to fully insert control blades in the immediate location of the leaking fuel rod as well as possible locations immediately surrounding the fuel rod. The consequence of such action is suppression of power for the remainder of the cycle with an accompanying penalty (loss) of cycle energy.

1b) Fuel Batch Corrosion

Following a fuel inspection, a particular batch of once-burned, highly reactive fuel indicates accelerated corrosion spread across a large number of bundles within the grouping. Current practice would be to extend the outage, replacing the problem fuel bundles with fuel from the spent fuel pool or with fresh fuel. Alternatively, one could simply shuffle the problem bundles into 'benign' core locations of lower power, such as core periphery. In either scenario, a new loading pattern would need to be generated and licensed, which can be costly as well as delay plant startup. In the former case, use of fresh bundles would incur additional cost while in the latter case, shuffling to the periphery would result in a substantial loss of energy.

1c) Flow Degradation Due to Jet Pump Failure

In this scenario, the reactor flow capability (i.e. the ability to maintain the rated flow) is projected to degrade with time due to the accumulation of crud deposits in the jet pump drive flow nozzles. Since 'cleaning' the jet pumps to remove such crud is a costly endeavor (about 4 million dollars per cycle), utilities may choose to allow some flow degradation if the fuel cycle economic penalty is not too high. The rate of flow degradation, based on historical data, is estimated to be a certain rate. However, it is also known that the uncertainty with this estimate is fairly high.

1d) Degradation of Steam Separators

In this scenario, an increase in steam production in certain 'hot' areas of the reactor core result in a decrease in the steam separation efficiency (i.e., the ability to remove water liquid from the steam/water mixture). As a result, a greater amount of liquid is carried through the separators, through the steam lines, and on to the turbine blades (liquid impinging on turbine blades can erode the blades). This scenario is most likely during a power uprate (since the separators were 'sized' for a particular steam/liquid flow rate). A solution is to replace the separators with 'improved' versions that are more efficient at handling the higher steam qualities.

Under category 2) the following are a couple exemplary scenarios:

2a) Thermal Limit

Historical operating data indicates that the reactor measured local power is greater than the predicted local power during a certain time period of the operating cycle. Because of this deviation, the plant is in jeopardy of violating the constraint on thermal limit. A thermal limit is any one of several design constraints related to nuclear heat generation and dissipation that protect the integrity of the nuclear fuel rod. In order to satisfy regulatory requirements, the plant would be forced to reduce overall power level until the measured local power violation of the constraint limit was eliminated. This reduced power level would have to be maintained until sufficient margin was made available, either through fuel depletion or through control blade and flow maneuvers, in order to return the plant to full power operation. A power reduction of this nature, if only a few percent, has tremendous negative economic impact to the plant.

2b) Operation Beyond Historical Operational Experience

Extending cycle length beyond that normally anticipated puts the reactor in an operational realm where biases between predicted and measured data are not well established. In addition, no measurements will become available during the operating cycle until just before shutdown, at which point measurements will be performed. An example is the cold shutdown margin, which is a measure of how far away the reactor is from achieving a self-sustaining nuclear chain reaction during a shutdown condition with control rods fully inserted. In this situation, there is a need to apply additional conservatisms on the constraint limit values during the design phase. This additional conservatism can result in a less efficient fuel cycle design.

SUMMARY OF THE INVENTION

The invention provides a method for improving nuclear reactor performance. Issues can arise during plant operation which require adjustments in the operation of the reactor. These problems may be mechanical in nature, deviations from the operational model used in managing plant operation, etc.

According to the method of the present invention, these issues are modeled as constraints and a new operational solution accounting for such a constraint is generated. The newly generated operational solution can then be implemented at the reactor.

In generating the operational solution accounting for such a constraint, an embodiment of the present invention involves modifying an existing objective function for optimizing nuclear reactor operation to include the constraint accounting for the issue which has arisen, or configuring a new objective function for optimizing nuclear reactor operation that includes the constraint accounting for the issue which has arisen. An operational solution is then generated using the modified or newly configured objective function.

In a further embodiment of the present invention, data obtained after operating the core according to the newly generated operational solution is obtained and used to further revise the constraint accounting for the problem at issue and/or the objective function including that constraint. As such, regenerating an operational solution using the updated or revised objective function will further improve operational performance when the operational solution is implemented.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION

Figure 4:
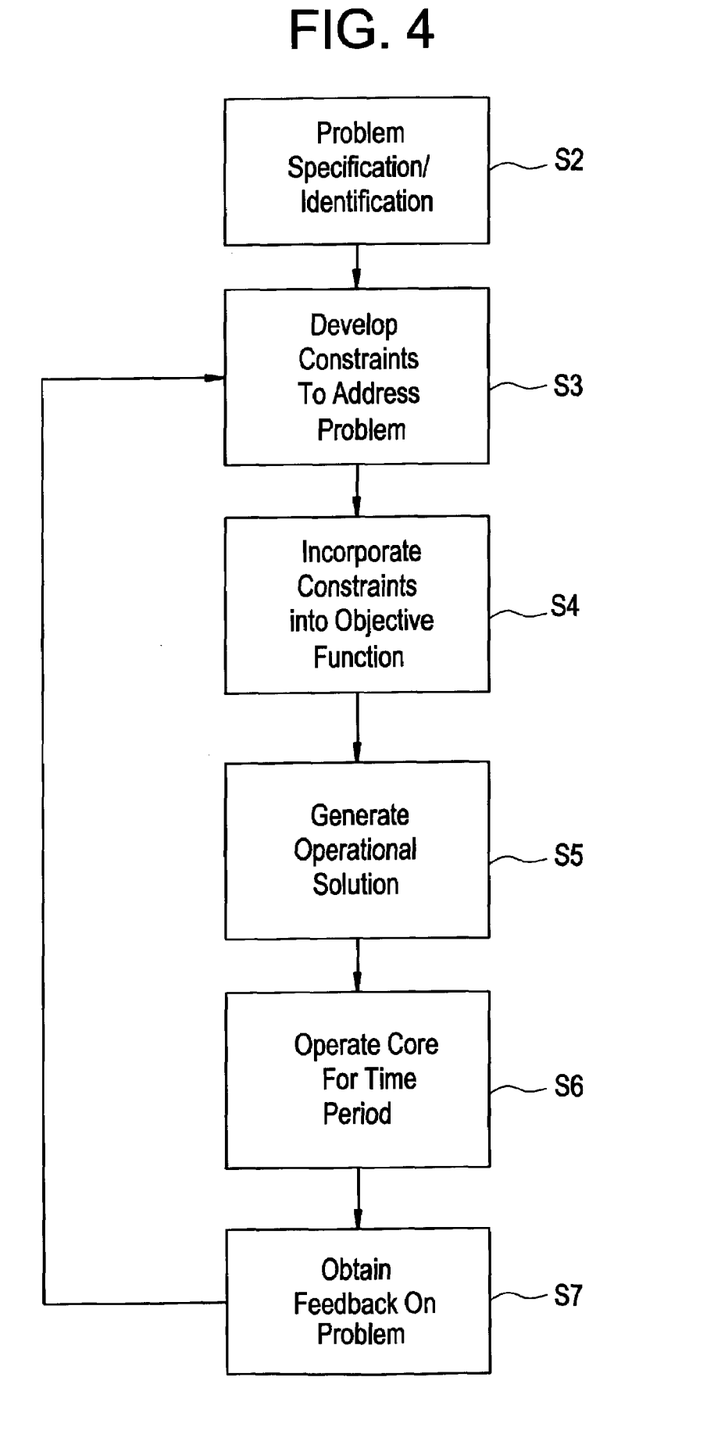
FIG. 4 illustrates a flow chart for the method of improving nuclear reactor performance according to an embodiment of the present invention.

FIG. 4 illustrates a flow chart for the method of improving nuclear reactor performance according to an embodiment of the present invention. As shown, in step S2, a problem is identified. For example, the problem may be a mechanical degradation of fuel or system components or may be a deviation in predicted versus anticipated measured plant parameters. As described previously, examples of mechanical degradation include leaking fuel rod, fuel batch corrosion, flow degradation due to crud deposition in jet pump nozzles, degradation of steam separators, etc. Examples of scenarios where deviations in predicted versus anticipated measured plant parameters have reached a significant magnitude to require additional conservatism in reactor operation include differences between measured and predicted thermal limit data, operation beyond the historical operational experience of the reactor, etc.

Having identified the problem or problems at issue, the method according to the present invention involves generating an operational solution for the nuclear reactor using an objective function that includes a constraint accounting for each identified problem, and then implementing the operational solution. Accordingly, in step S3, a constraint is developed to address the identified problem. Namely, a mathematical expression representing the constraint is developed. This constraint is then incorporated into the objective function used in optimizing core operation in step S4. Alternatively, the development of the constraint representing the problem at issue can be formed as part of developing a new objective function for optimizing core operation.

Having determined the new objective function or having modified an existing objective function, either of which includes the constraint representing the problem at issue, the new operational solution is developed in step S5. More specifically, a new model for operating the reactor core is developed in step S5.

The core is then operated according to the generated operational solution in step S6 for a period of time. Based on this further operation of the core, new data regarding core operation is obtained in step S7, and the above described process beginning in step S3 can be repeated based on this new data. Namely, the constraint and/or objective function may be further modified in light of the newly developed operational data.

Next, the development of an objective function and constraints therefore will be described followed by a method for generating an operational solution based on the objective function.

The Generic Objective Function and Developing Constraints (Step S3)

A generic definition of an objective function, which is applicable across a wide variety of constraint and optimization problems such as any large scale, combinatorial optimization problem in discrete or continuous space (e.g., boiling water reactor core design, pressurized water reactor core design, transportation scheduling, resource allocation, etc.) is shown by the expression below. The generic objective function is defined as a sum of credit and penalty components. A penalty component includes a penalty term multiplied by an associated penalty weight. A credit component includes a credit term multiplied by an associated credit weight. The credit terms represent the optimality conditions for the problem. The penalty terms represent the constraints for the problem. Each credit term is a mathematical expression that quantifies an optimality condition. Each penalty term is a mathematical expression that quantifies a constraint. Mathematically, this can be expressed as follows:

$$F_{obj} = \sum_n \lambda_m^{credit} C_m + \sum_n \lambda_n^{penalty} P_n$$

where, $F_{obj}$=objective function $C_m$=credit term m $P_n$=penalty term n $\lambda_m^{credit}$=weight factor credit term m $\lambda_m^{penalty}$=weight factor penalty term n Credit and penalty terms may be defined by maximum (i.e. upper bounded) or minimum (i.e. lower bounded) values and can represent scalar or multi-dimensional values. The only requirements are: 1) the penalty terms must be positive for constraint violations and zero otherwise, and 2) in the absence of constraint violations, the credit terms are consistent with a minimization problem. Thus, minimizing the modified objective function solves the optimization problem.

Forms for the credit or penalty terms include, but are not limited to:

The maximum value within a data array;
The minimum value within a data array;
The average of values within a data array;
The integral of values within a data array;
The maximum of calculated differences between elements of a data array and the corresponding constraint limit, restricted to elements that violate such maximum;
The minimum of calculated differences between elements of a data array and the corresponding constraint limit, restricted to elements that violate such minimum;
The average of calculated differences between elements of a data array and the corresponding constraint limit, restricted to elements that violate such average; and
The integral of calculated differences between elements of a data array and the corresponding constraint limit, restricted to elements that violate such integral.

A Generic Architecture for Implementing the Objective Function

Figure 5:
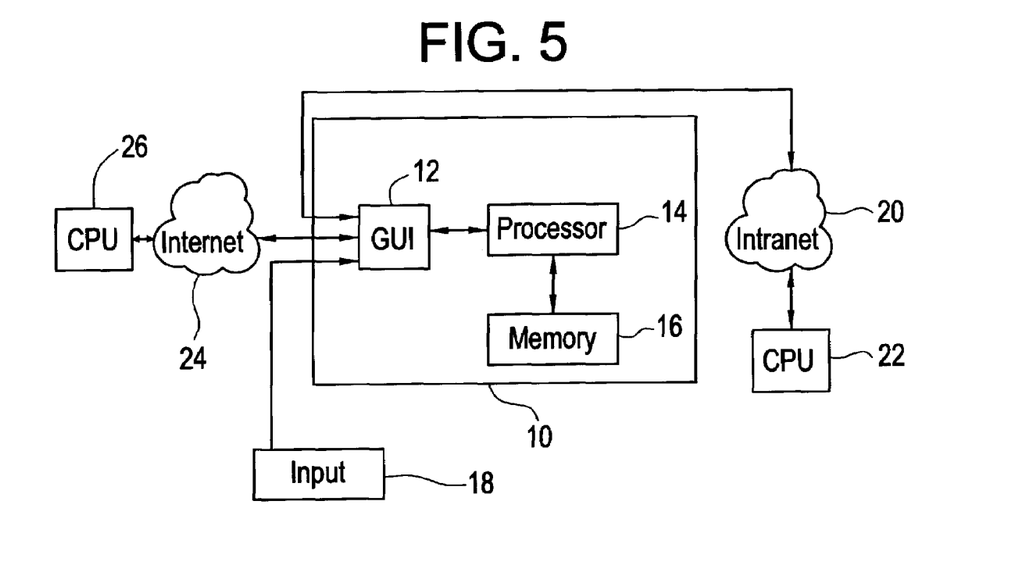
FIG. 5 illustrates an embodiment of an architecture for implementing a method of evaluating a proposed solution.

FIG. 5 illustrates an embodiment of an architecture for implementing the method of evaluating a proposed solution according to the present invention. As shown, a server 10 includes a graphical user interface 12 connected to a processor 14. The processor 14 is connected to a memory 16. The server 10 is directly accessible by a user input device 18 (e.g., a display, keyboard and mouse). The server 10 is also accessible by computers 22 and 26 over an intranet 20 and the Internet 26, respectively. The operation of the architecture shown in FIG. 5 will be discussed in detail below.

Configuring the Objective Function for an Optimization Problem (Step S4 or a Combined Step of Steps S3 and S4)

According to one embodiment, a configured objective function satisfying the above-described generic definition is already stored in the memory 16 of the server 10. For example, the configured objective function could have been configured according to one of the embodiments described below. In this embodiment, the user instructs the server 10 to provide a list of the configured objective functions stored in the memory 16, and instructs the server 10 to use one of the listed configured objective functions.

In another embodiment, a user via input 18, computer 26 or computer 22 accesses the server 10 over the graphical user interface 12. The user supplies the server 10 with a configured objective function meeting the definition of the above-described generic definition. In this embodiment, the user supplies the configured objective function using any well-known programming language or program for expressing mathematical expressions. Specifically, the user instructs the processor 14 via the graphical user interface 12 to upload a file containing the configured objective function. The processor 14 then uploads the file, and stores the file in memory 16.

Also, a combination of the above two described embodiments can be used. Namely, the configured objective function stored in the memory 16 can be accessed, and then modified to include, for example, an additional constraint uploaded by the user.

In still another embodiment, configuring the objective function is interactive between the user and the server 10. Here, the user instructs the processor 14 to start the process for configuring an objective function. The processor 14 then requests the user to identify the number of credit components and the number of penalty components. For each credit component, the processor 14 requests that the user provide a mathematical expression for the credit term and an initial weight for the associated credit weight. For each penalty component, the processor 14 requests that the user provide a mathematical expression for the penalty term and an initial weight for the associated penalty weight. In supplying the mathematical expression, the processor 14 via the graphical user interface 12 accepts definitions of mathematical expressions according to any well-known programming language or program.

Again, a stored configured objective function can be accessed by the user, and then modified as described in the preceding embodiment, to include a constraint addressing the identified problem.

In another embodiment, the server 10 is preprogrammed for use on a particular constraint or optimization based problem. In this embodiment, the server 10 stores possible optimization parameters and possible constraint parameters associated with the particular optimization or constraint problem. When a user instructs the processor 14 via the graphical user interface 12 to configure an objective function, the processor 14 accesses the possible optimization parameters already stored in the memory 16, and provides the user with the option of selecting one or more of the optimization parameters for optimization. In this manner the user can include a constraint addressing the identified problem, or modify an existing configured objective function to include such a constraint.

Figure 6:
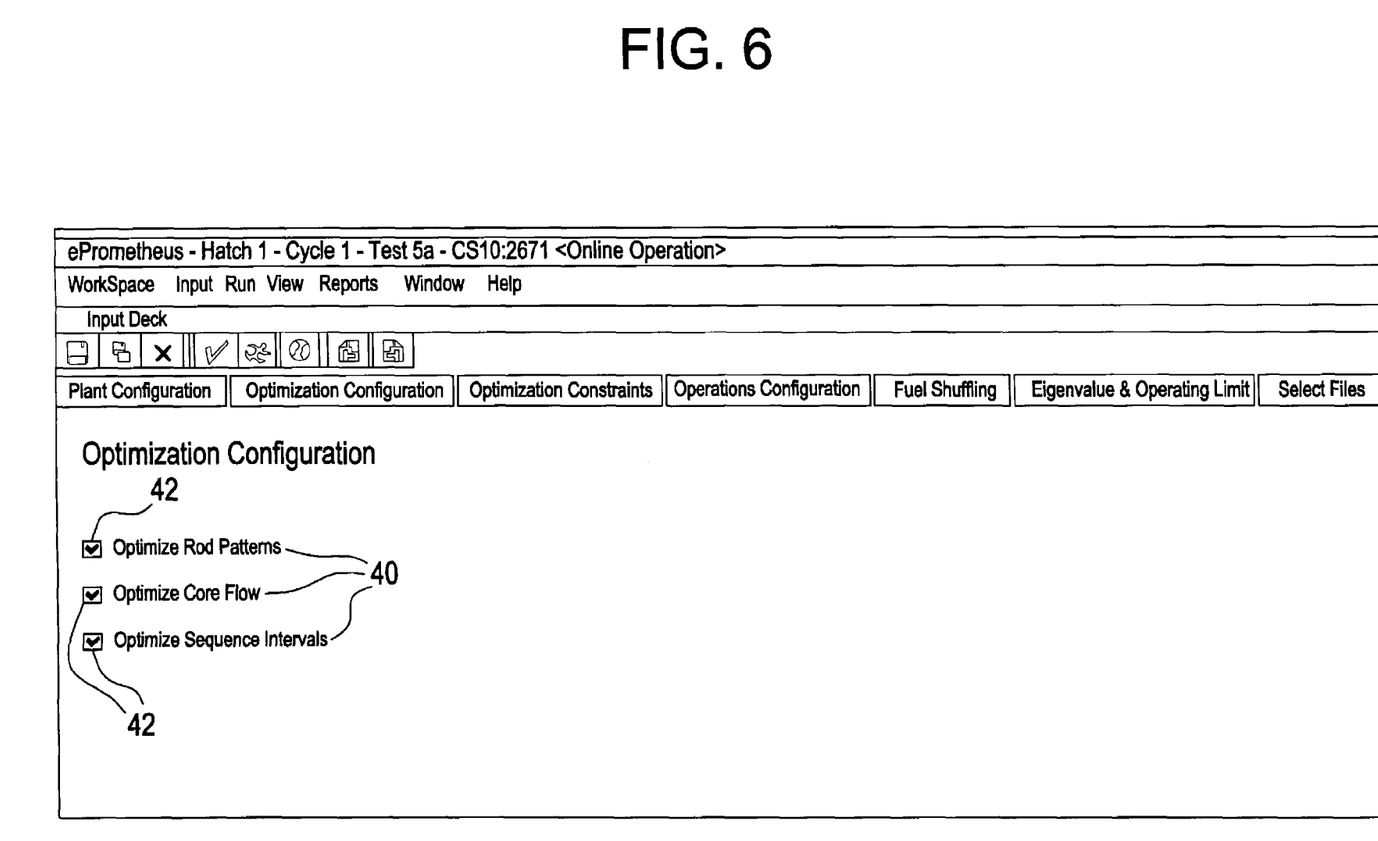
FIG. 6 illustrates a screenshot of an optimization configuration page used in selecting one or more operation parameters associated with the optimization problem with boiling water reactor core design.

FIG. 6 illustrates a screen shot of an optimization configuration page used in selecting one or more optimization parameters associated with the optimization problem of boiling water reactor core design according to this embodiment. As shown, the optimization parameters 40 optimize rod patterns, optimize core flow, and optimize sequence intervals, and are available for selection by the user as optimization parameters. Optimize rod patterns means making an optimal determination of individual control rod insertion positions within a control rod grouping (called a sequence), for the duration of time during the operating cycle when the given sequence is being used to control the reactor. Rod positions affect the local power as well as the nuclear reaction rate. Optimize core flow means making an optimal determination of reactor coolant flow rate through the reactor as a function of time during the operating cycle. Flow rate affects global reactor power as well as the nuclear reaction rate. Optimize sequence intervals means making an optimal determination of the time duration for a given sequence (i.e., control rod grouping) that is used to control the reactor during the operating cycle. Sequence intervals affect local power as well as the nuclear reaction rate.

Using the data input device 18, computer 22 or computer 26, each of which includes a display and a computer mouse, the user selects one or more of the optimization parameters by clicking in the selection box 42 associated with an optimization parameter 40. When selected, a check appears in the selection box 42 of the selected optimization parameter. Clicking in the selection box 42 again de-selects the optimization parameter.

Figure 7:
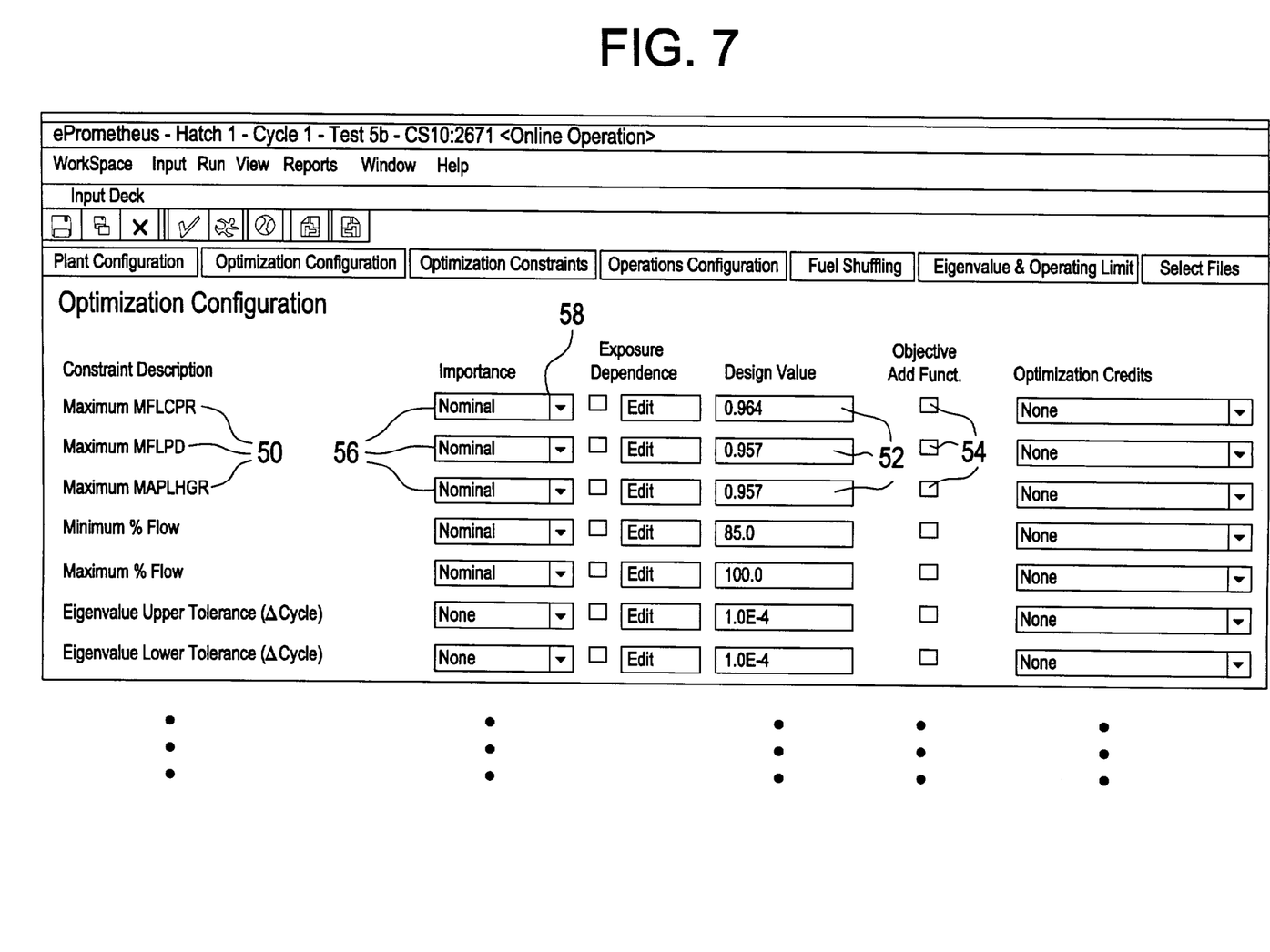
FIG. 7 illustrates a screenshot of an optimization constraints page listing optimization constraints associated with the optimization problem of boiling water reactor core design.

The memory 16 also stores constraint parameters associated with the optimization problem. The constraint parameters are parameters of the optimization problem that must or should satisfy a constraint or constraints. FIG. 7 illustrates a screen shot of an optimization constraints page listing optimization constraints associated with the optimization problem of boiling water reactor core design according to this embodiment of the present invention. As shown, each optimization constraint 50 has a design value 52 associated therewith. Each optimization constraint must fall below the specified design value. The user has the ability to select optimization parameters for consideration in configuring the objective function. Using the data input device 18, computer 22 or computer 26, each of which includes a display and a computer mouse, the user selects an optimization constraint by clicking in the selection box 54 associated with an optimization constraint 50. When selected, a check appears in the selection box 54 of the selected optimization constraint 50. Clicking in the selection box 54 again de-selects the optimization constraint.

Each optimization parameter has a predetermined credit term and credit weight associated therewith stored in memory 16. Similarly, each optimization constraint has a predetermined penalty term and penalty weight associated therewith stored in memory 16. In the embodiment shown in FIG. 7, the penalty term incorporates the design value, and the user can change (i.e., configure) this value as desired. Additionally, the embodiment of FIG. 7 allows the user to set an importance 56 for each optimization constraint 50. In the importance field 58 for an optimization constraint, the user has pull down options of minute, low, nominal, high and extreme. Each option correlates to an empirically predetermined penalty weight such that the greater the importance, the greater the predetermined penalty weight. In this manner, the user selects from among a set of predetermined penalty weights.

Once the above-selections have been completed, the processor 14 configures the objective function according to the generic definition discussed above and the selections made during the selection process. The resulting configured objective function equals the sum of credit components associated with the selected optimization parameters plus the sum of penalty components associated with the selected optimization constraints.

Additionally, the embodiment provides for the user to select a method of handling the credit and penalty weights. For example, the user is supplied with the possible methodologies of static, death penalty, dynamic, and adaptive for the penalty weights; is supplied with the possible methodologies of static, dynamic and adaptive for the credit weights; and the methodology of relative adaptive for both the penalty and credit weights. The well-known static methodology maintains the weights at their initially set values. The well-known death methodology sets each penalty weight to infinity. The well-known dynamic methodology adjusts the initial weight value during the course of the objective function's use in an optimization search based on a mathematical expression that determines the amount and/or frequency of the weight change. The well-known adaptive methodology is also applied during the course of an optimization search. In this method, penalty weight values are adjusted periodically for each constraint parameter that violates the design value. The relative adaptive methodology is disclosed in U.S. application Ser. No. 10/246,718, titled METHOD AND APPARATUS FOR ADAPTIVELY DETERMINING WEIGHT FACTORS WITHIN THE CONTEXT OF AN OBJECTIVE FUNCTION, by inventors of the subject application.

Optimization Using the Objective Function (Step S5)

Figure 8:
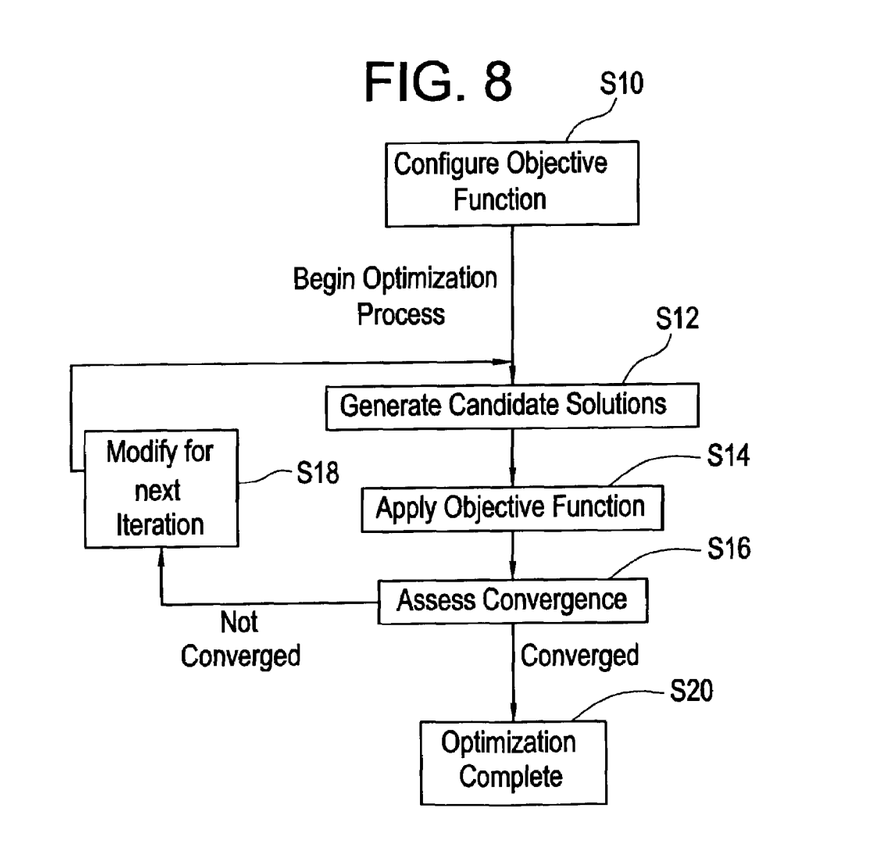
FIG. 8 illustrates a flow chart of an optimization process for use in the method according to the present invention.

FIG. 8 illustrates a flow chart of an optimization process employing the objective function of the present invention. For the purposes of explanation only, the optimization process of FIG. 8 will be described as being implemented by the architecture illustrated in FIG. 5. In step S12, the processor 14 retrieves from memory 16 or generates one or more sets of values for input parameters (i.e., system inputs) of the optimization problem based on the optimization algorithm in use. For example, for the optimization problem of boiling water reactor core design, some of the input parameters would be placement of fresh and exposed fuel bundles within the reactor, selection of the rod groups (sequences) and placement of the control rod positions within the groups as a function of time during the cycle, core flow as a function of time during a cycle, reactor coolant inlet pressure, etc. Each input parameter set of values is a candidate solution of the optimization problem. The processor 14 runs a simulated operation and generates a simulation result for each input parameter set of values. For example, for boiling water reactor core design, a well-known simulation program for boiling water reactor operation is run using an input parameter set. The simulation result includes values (i.e., system outputs) for the optimization parameters and optimization constraints. These values, or a subset of these values, are values of the variables in the mathematical expressions of the objective function.

Then, in step S14, the processor 14 uses the objective function and the system outputs to generate an objective function value for each candidate solution. In step S16, the processor 14 assesses whether the optimization process has converged upon a solution using the objective function values generated in step S14. If no convergence is reached, then in step S18, the input parameter sets are modified, the optimization iteration count is increased and processing returns to step S12. The generation, convergence assessment and modification operations of steps S12, S16 and S18 are performed according to any well-known optimization algorithm such as Genetic Algorithms, Simulated Annealing, and Tabu Search. When the optimization problem is boiling water reactor core design, the optimization algorithm can be, for example, one of the optimization processes as disclosed in U.S. application Ser. No. 09/475,309, titled SYSTEM AND METHOD FOR OPTIMIZATION OF MULTIPLE OPERATIONAL CONTROL VARIABLES FOR A NUCLEAR REACTOR filed Dec. 30, 1999 or U.S. application Ser. No. 09/683,004, tilted SYSTEM AND METHOD FOR CONTINUOUS OPTIMIZATION OF CONTROL-VARIABLES DURING OPERATION OF A NUCLEAR REACTOR, filed Nov. 7, 2001.

Next, application of the method according to the present invention to the exemplary issues that arise during plant operation will be described. For mechanical degradation issues, application of the present invention involves generating a skewed, spatially dependent power distribution constraint as a function of time in step S3 and then performing a re-optimization involving a modified objective function that includes this constraint. For example, for leaking fuel rods, applying the method according to the present invention involves the minimal control rod insertion necessary to maintain the power at its constrained limit to control the offgas, and thus results in an improved operational solution that reduces or eliminates any loss in cycle length.

For the problem with fuel batch corrosion, a spatially dependent power constraint limit to constrain power within each of the locations containing the corrosion-susceptible fuel is developed in step S3. A re-optimization of the control rod and flow operations is then performed in step S5 using the modified or newly developed objective function including the above described constraint. The new operational solution will limit the power below a certain amount such that corrosion is mitigated. As a result, this solution eliminates any delay in plant startup, and does not require licensing of a new loading pattern.

For the problem of flow degradation from degraded jet pump performance, for example, due to crud accumulation in jet pump nozzles, an exposure dependent flow rate constraint is developed in step S3. This in conjunction with continual re-optimization of the operating strategy pursuant to steps S4-S7 helps minimize the consequences to cycle efficiency that the flow degradation could produce. Such minimization may be sufficient to prevent the need for the costly cleaning process and also provide improved energy output had the method not been performed.

For the problem of degradation of steam separators, a spatially dependent constraint on bundle exit steam quality that levels out steam flow to the separators is developed in step S3. The subsequent re-optimization that occurs in subsequent steps S4-S5 utilizing the spatially dependent constraint may eliminate this problem.

For issues involving deviations in predicted versus anticipated measured plant parameters of sufficient magnitude to require additional conservatism in reactor operation, time dependent constraints can be developed in step S3 to improve reactor performance in light of these issues. Specifically, for problems with the thermal limit, a time dependent constraint on thermal limit can be created based on a model of historical operating experience with certain fuel products and fuel cycle designs. This model can be calibrated based on actual plant operating data once the cycle begins operation. Periodic re-calibration of the model and re-optimization of this operational strategy using the exposure dependent thermal limit constraint may very well eliminate the problem.

When operating the plant beyond historical operational experience, exposure dependent constraints can be developed to maximize fuel cycle efficiency. The constraints are set identical to normal operating constraints at the boundary of the historical operating experience. However, beyond that point, the constraints become gradually more restrictive until a maximum conservatism at an anticipated EOC is reached. This operational strategy helps improve performance beyond the historical operational experience.

The invention claimed is:

1. A method of improving nuclear reactor performance, comprising:
   implementing an operational solution generated for the nuclear reactor using an objective function including at least one of a spatially dependent and exposure dependent constraint accounting for a problem with operation of the nuclear reactor, the problem being an unintended change in reactor performance or configuration and capable of being represented by the at least one of the spatially dependent constraint and the exposure dependent constraint in the objective function, and the objective function producing a figure of merit for the operational solution.

2. The method of claim 1, wherein the constraint is a spatially dependent power distribution constraint.

3. The method of claim 2, wherein the spatially dependent power distribution constraint accounts for one or more leaking fuel rods.

4. The method of claim 2, wherein the spatially dependent power distribution constraint accounts for one or more corrosion-susceptible locations.

5. The method of claim 2, wherein the spatially dependent power distribution constraint accounts for degradation in reactor flow.

6. The method of claim 2, wherein the spatially dependent power distribution constraint accounts for degraded exit steam quality.

7. The method of claim 1, wherein the constraint is an exposure dependent constraint.

8. The method of claim 7, wherein the exposure dependent constraint accounts for exposure dependency of thermal limit.

9. The method of claim 7, wherein the exposure dependent constraint accounts for one or more parameters having exposure dependency when the nuclear reactor operates beyond an anticipated cycle length.

10. The method of claim 1, further comprising:
    modifying the constraint based on performance of the nuclear reactor following the implementing step; and
    repeating the implementing step using the modified constraint.

11. A method of improving nuclear reactor performance, comprising:
generating an operational solution for the nuclear reactor using an objective function including at least one of a spatially dependent and exposure dependent constraint accounting for a problem with operation of the nuclear reactor, the problem being an unintended change in reactor performance or configuration and capable of being represented by the at least one of the spatially dependent constraint and the exposure dependent constraint in the objective function, the objective function producing a figure of merit for the operational solution, and
implementing the operational solution.

12. The method of claim 11, wherein the constraint is a spatially dependent power distribution constraint.

13. The method of claim 12, wherein the spatially dependent power distribution constraint accounts for one or more leaking fuel rods.

14. The method of claim 12, wherein the spatially dependent power distribution constraint accounts for one or more corrosion-susceptible locations.

15. The method of claim 12, wherein the spatially dependent power distribution constraint accounts for degradation in reactor flow.

16. The method of claim 12, wherein the spatially dependent power distribution constraint accounts for degraded exit steam quality.

17. The method of claim 11, wherein the constraint is an exposure dependent constraint.

18. The method of claim 17, wherein the exposure dependent constraint accounts for exposure dependency of thermal limit.

19. The method of claim 17, wherein the exposure dependent constraint accounts for one or more parameters having exposure dependency when the nuclear reactor operates beyond an anticipated cycle length.

20. The method of claim 11, further comprising:
developing the constraint; and
developing the objective function including the constraint.

21. The method of claim 20, wherein the developing the objective function step modifies a pre-existing objective function by adding the constraint to the objective function.

22. The method of claim 11, wherein the generating step is a constraint based optimization operation.

23. The method of claim 11, further comprising:
modifying the constraint based on performance of the nuclear reactor following the implementation of the operational solution; and repeating the generating step using the modified constraint.

24. A method of improving nuclear reactor performance, comprising:
generating an operational solution for the nuclear reactor using an objective function including a constraint tailored to a problem with operation of the nuclear reactor, the problem being an unintended change in reactor performance or configuration and capable of being represented by the at least one of the spatially dependent constraint and the exposure dependent constraint in the objective function, the objective function producing a figure of merit for the operational solution, and
implementing the operational solution.

* * * * *